(12) United States Patent
Burghard et al.

(10) Patent No.: US 10,423,474 B2
(45) Date of Patent: *Sep. 24, 2019

(54) PERFORMING DIAGNOSTIC TRACING OF AN EXECUTING APPLICATION TO IDENTIFY SUSPICIOUS POINTER VALUES

(71) Applicant: International Business Machines Corporation, Armonk, NY (US)

(72) Inventors: Stephen John Burghard, Portsmouth (GB); David J. Harman, Hursley (GB); Neil W. Leedham, Bursledon (GB); Andrew Wright, Chandlers Ford (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/812,659

(22) Filed: Jul. 29, 2015

(65) Prior Publication Data

US 2015/0331738 A1 Nov. 19, 2015

Related U.S. Application Data

(63) Continuation of application No. 14/053,418, filed on Oct. 14, 2013, now Pat. No. 9,128,832, which is a (Continued)

(51) Int. Cl.
*G06F 11/00* (2006.01)
*G06F 11/07* (2006.01)
(Continued)

(52) U.S. Cl.
CPC ........ *G06F 11/0706* (2013.01); *G06F 11/079* (2013.01); *G06F 11/0751* (2013.01);
(Continued)

(58) Field of Classification Search
CPC ............. G06F 11/0703; G06F 11/0706; G06F 11/0718; G06F 11/0721; G06F 11/0766;
(Continued)

(56) References Cited

U.S. PATENT DOCUMENTS

| 5,978,902 A * | 11/1999 | Mann ................... G06F 11/348 712/227 |
|---|---|---|
| 7,039,833 B2 | 5/2006 | Knuutila et al. |

(Continued)

FOREIGN PATENT DOCUMENTS

| GB | 2507505 A | 5/2014 |
|---|---|---|
| JP | 04-032936 A | 2/1992 |

(Continued)

OTHER PUBLICATIONS

Bose, R.P.J.C. et al., "Trace Alignment in Process Mining: Opportunities for Process Diagnostics," In Business Processing Management, LNCS 6336, pp. 227-242, 2010, <http://www.processmining.org/_media/publications/trace-alignment-jc-p600.pdf>.

(Continued)

*Primary Examiner* — Anthony J Amoroso
(74) *Attorney, Agent, or Firm* — Cuenot, Forsythe & Kim, LLC

(57) ABSTRACT

Arrangements described herein relate to performing diagnostic tracing of an executing application. A trace entry in trace data can be identified, the trace entry comprising a pointer that refers to a memory address. Whether a value that is, or has been, stored at the memory address is an erroneous value can be determined. Responsive to determining that the value that is, or has been, stored at the memory address is an erroneous value, the pointer can be indicated as being a suspicious value.

15 Claims, 5 Drawing Sheets

Related U.S. Application Data continuation of application No. 13/715,472, filed on Dec. 14, 2012, now Pat. No. 9,164,821.

(51) Int. Cl.
 *G06F 11/10* (2006.01)
 *G06F 11/36* (2006.01)

(52) U.S. Cl.
 CPC ...... *G06F 11/0766* (2013.01); *G06F 11/0772* (2013.01); *G06F 11/0778* (2013.01); *G06F 11/1016* (2013.01); *G06F 11/366* (2013.01); *G06F 11/3636* (2013.01)

(58) Field of Classification Search
 CPC ............ G06F 11/0778; G06F 11/079; G06F 11/1016; G06F 11/3636; G06F 11/366; G06F 9/3861; G06F 11/0751; G06F 11/0772
 See application file for complete search history.

(56) References Cited

U.S. PATENT DOCUMENTS

| | | | |
|---|---|---|---|
| 7,069,470 B2 * | 6/2006 | Wilding | G06F 11/366 712/244 |
| 7,080,283 B1 * | 7/2006 | Songer | G06F 11/3636 714/30 |
| 7,200,588 B1 | 4/2007 | Srivastava et al. | |
| 7,200,776 B2 | 4/2007 | Harris | |
| 7,424,646 B2 | 9/2008 | Smith | |
| 7,437,619 B2 | 10/2008 | McCullough et al. | |
| 7,475,387 B2 | 1/2009 | Chandane | |
| 7,610,514 B2 | 10/2009 | Modani et al. | |
| 7,975,183 B2 | 7/2011 | Xu et al. | |
| 8,001,427 B2 | 8/2011 | Sohm et al. | |
| 8,132,159 B1 | 3/2012 | Lindahl et al. | |
| 8,181,161 B2 | 5/2012 | Kollmann et al. | |
| 8,943,370 B2 | 1/2015 | Burghard et al. | |
| 9,128,832 B2 | 9/2015 | Burghard et al. | |
| 9,164,821 B2 | 10/2015 | Burghard et al. | |
| 2005/0273665 A1 | 12/2005 | Menadue | |
| 2008/0126325 A1 | 5/2008 | Pugh et al. | |
| 2009/0106741 A1 | 4/2009 | Dageville et al. | |
| 2009/0216967 A1 | 8/2009 | Sugawara | |
| 2010/0088683 A1 | 4/2010 | Golender et al. | |
| 2010/0100774 A1 | 4/2010 | Ding et al. | |
| 2012/0066551 A1 * | 3/2012 | Palus | G06F 11/28 714/39 |
| 2012/0066552 A1 | 3/2012 | Gilkerson et al. | |
| 2012/0089810 A1 | 4/2012 | Mayer et al. | |
| 2012/0246518 A1 | 9/2012 | Francis et al. | |
| 2013/0346806 A1 | 12/2013 | Burghard et al. | |
| 2014/0173356 A1 | 6/2014 | Burghard et al. | |
| 2015/0154099 A1 | 6/2015 | Burghard et al. | |

FOREIGN PATENT DOCUMENTS

| | | |
|---|---|---|
| JP | 07-064825 A | 3/1995 |
| JP | 2004185345 A | 7/2004 |
| WO | 2011116988 A1 | 9/2011 |

OTHER PUBLICATIONS

Ayers, A. et al., "TraceBack: First Fault Diagnosis by Reconstruction of Distributed Control Flow," In ACM SIGPLAN Conf. on Programming Language Design and Implementation, vol. 40, No. 6, ACM, Jun. 11-15, 2005, pp. 201-212.

Trumper, J. et al., "Unerstanding Complex Multithreaded Software Systems by Using Trace Visulatization," ACM Proc. of 5th Int'l. Sym. on Software Visualization (Softvis'10), Oct. 17-21, 2010, pp. 133-142.

Yuan, C. et al. "Automated known problem diagnosis with event traces," ACM SIGOPS Operating Systems Review, Proc. of 2006 EuroSys Conf., vol. 40. No. 4, pp. 375-388, 2006.

Matni, G.N. et al., "Operating System Level Trace Analysis for Automated Problem Identification," Open Cybernetics & Systemics Journal, No. 4, 2011, pp. 45-52.

UK Appln. No. GB1219535.0, Search Report, dated Mar. 14, 2013, 3 pg.

U.S. Appl. No. 13/529,616, Non-Final Office Action, dated Jun. 12, 2014, 12 pg.

U.S. Appl. No. 13/529,616, Final Office Action, dated Jan. 28, 2015, 14 pg.

U.S. Appl. No. 13/529,616, Advisory Action, dated Apr. 28, 2015, 3 pg.

U.S. Appl. No. 13/529,616, Advisory Action, dated May 12, 2015, 3 pg.

U.S. Appl. No. 13/529,616, Notice of Allowance, dated Jun. 10, 2015, 5 pg.

U.S. Appl. No. 14/053,418, Non-Final Office Action, dated Sep. 19, 2014, 13 pg.

U.S. Appl. No. 14/053,418, Final Office Action, dated Jan. 28, 2015, 14 pg.

U.S. Appl. No. 14/053,418, Notice of Allowance, dated Apr. 29, 2015, 6 pg.

* cited by examiner

PERFORMING DIAGNOSTIC TRACING OF AN EXECUTING APPLICATION TO IDENTIFY SUSPICIOUS POINTER VALUES

CROSS-REFERENCE TO RELATED APPLICATIONS

This application is a Continuation of U.S. application Ser. No. 13/715,472, filed on Dec. 21, 2012, and is related to U.S. application Ser. No. 14/053,418, filed on Oct. 14, 2013.

BACKGROUND

The arrangements described herein relate to performing a diagnostic analysis on executing software. More particularly, the present arrangements relate to diagnostic tracing of an executing application.

Computing systems require memory in order to function. This computer memory is referenced by address, and the full range of memory available to the system is known as the address space. When a problem with a computer system is being investigated, a copy or image of this address space, that is, the memory addresses and address data contents, can be stored for later inspection. Such data is commonly referred to as core or dump data and stored in a core or dump file.

If the program under investigation has been written to include trace entries, these can be enabled so that diagnostic information in the form of trace data is written out or cut to a trace file during the execution of the program. The combination of the dump or core data and the trace data enables engineers analyzing the performance of the relevant program to inspect the contents of memory when the dump file was taken and compare this with the trace data produced during the processing of the program in an attempt to identify the cause of a problem.

BRIEF SUMMARY

One or more embodiments disclosed within this specification relate to performing diagnostic tracing of an executing application.

An embodiment can include method. The method can include identifying a trace entry in trace data, the trace entry comprising a pointer that refers to a memory address. The method further can include determining, using a processor, whether a value that is, or has been, stored at the memory address is an erroneous value. The method also can include, responsive to determining that the value that is, or has been, stored at the memory address is an erroneous value, indicating the pointer as being a suspicious value.

Another embodiment can include a method, which includes identifying a trace entry in trace data, the trace entry comprising a pointer that refers to a memory address. The method also can include determining, using a processor, whether a value that is, or has been, stored at the memory address is an erroneous value by processing delta core data generated for at least one trace entry, wherein the delta core data is data that represents at least a portion of a difference between a first set of core data and a second set of core data. The method further can include responsive to determining that the value that is, or has been, stored at the memory address is an erroneous value, indicating the pointer as being a suspicious value.

Another embodiment can include a system having a processor. The processor can be configured to initiate executable operations including identifying a trace entry in trace data, the trace entry comprising a pointer that refers to a memory address. The executable operations also can include determining whether a value that is, or has been, stored at the memory address is an erroneous value. The executable operations further can include responsive to determining that the value that is, or has been, stored at the memory address is an erroneous value, indicating the pointer as being a suspicious value Another embodiment can include a computer program product for performing diagnostic tracing of an executing application. The computer program product can include a computer-readable storage medium having stored thereon program code that, when executed, configures a processor to perform a method. The method can include identifying a trace entry in trace data, the trace entry comprising a pointer that refers to a memory address. The method further can include determining, using a processor, whether a value that is, or has been, stored at the memory address is an erroneous value. The method also can include, responsive to determining that the value that is, or has been, stored at the memory address is an erroneous value, indicating the pointer as being a suspicious value.

DETAILED DESCRIPTION

Figure 1:
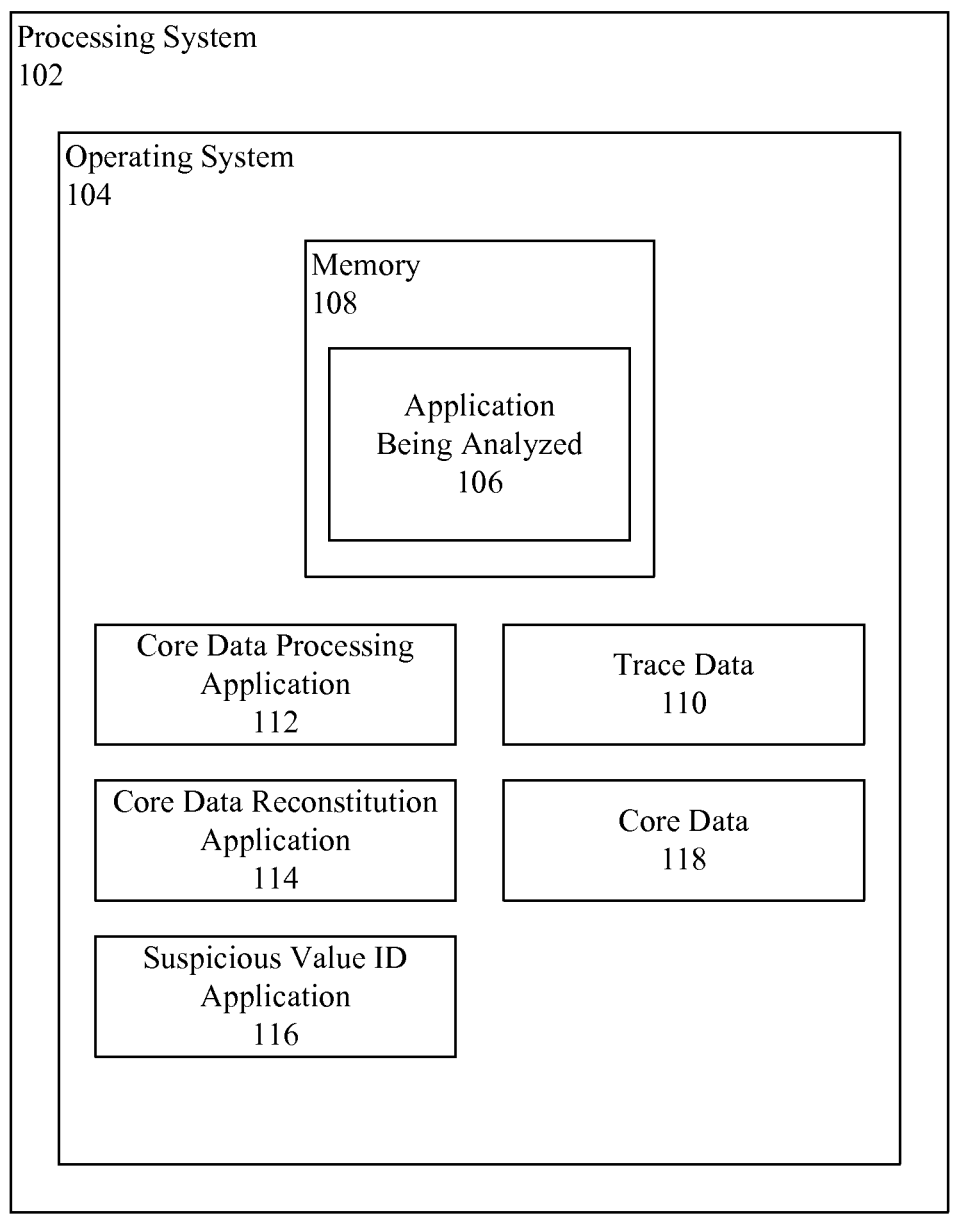
FIG. 1 is a block diagram illustrating a system for performing diagnostic tracing of an executing application in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As will be described herein, many trace entries (e.g., records) within a trace comprise fields that include pointers to memory addresses. Such memory addresses may contain erroneous values (i.e., unexpected or incorrect values), or values that otherwise warrant further investigation. In accordance with the present arrangements, the pointers that point to such memory addresses can be identified as suspicious field values, and indicated as being suspicious field values in the respective trace entries. For example, the pointers can be highlighted in the trace entries.

The determination of whether a pointer is a suspicious field value can be made based not only on the particular trace entry that includes the pointer, but also on delta core data generated to track changes to memory content. Thus, if content stored at a particular memory address changes as the application being traced continues to run (e.g., the content is overwritten, the memory freed or reused, etc.), the arrangements described herein still can identify erroneous values in the content stored in memory, and identify pointers to such memory addresses as being suspicious. As used herein, a "pointer" is a data type whose value refers to a memory address containing another value. The pointer value may be a memory address where the other value is stored, or an offset value from another memory address that can be used to determine the memory address where the other value is stored. Hereinafter, a memory address may simply be referred to as an "address."

FIG. 1 is a block diagram illustrating a system 100 for performing diagnostic tracing of an executing application in accordance with one embodiment disclosed within this specification. The system 100 can include a processing system 102 comprising at least one processor executing an operating system 104 to provide a platform for executing one or more applications. The processing system 102 will be described herein in further detail.

An application being analysed 106 can be executed by the processing system 102, and corresponding data can be stored in memory 108, at least temporarily, in a conventional manner. The application 106 can be provided with trace code (not shown), which is configured to output trace data 110 at points in the processing of the application 106 referred to as trace points. Executing within an environment provided by the operating system 104 can be a core data processing application 112, a core data reconstitution application 114 and a suspicious value identification application 116.

In another arrangement, rather than executing on the processing system 102, the application 106 can be executed on a processing system distinct from the processing system 102, and thus on an operating system distinct from the operating system 104. The processing system 102 can be communicatively linked to such other processing system to collect the trace data 110, core data 118, etc. generated during execution of the application 106.

The core data processing application 112 can be configured to store core data 118 in response to the production of each entry (e.g., record) of the trace data 110 by the trace points processed during the processing of the application 106, which will be described with reference to FIG. 2. The core data reconstitution application 114 can be configured to reconstitute one or more images of the memory 108 from the core data 118 to generate reconstituted core data. Each of such images can be substantially contemporaneous to a respective selected entry of the trace data 110, which will be described with reference FIG. 3. The suspicious value identification application 116 can be configured to identify and highlight suspicious field values in the trace data 110, as will be described with reference to FIG. 4.

Figure 2:
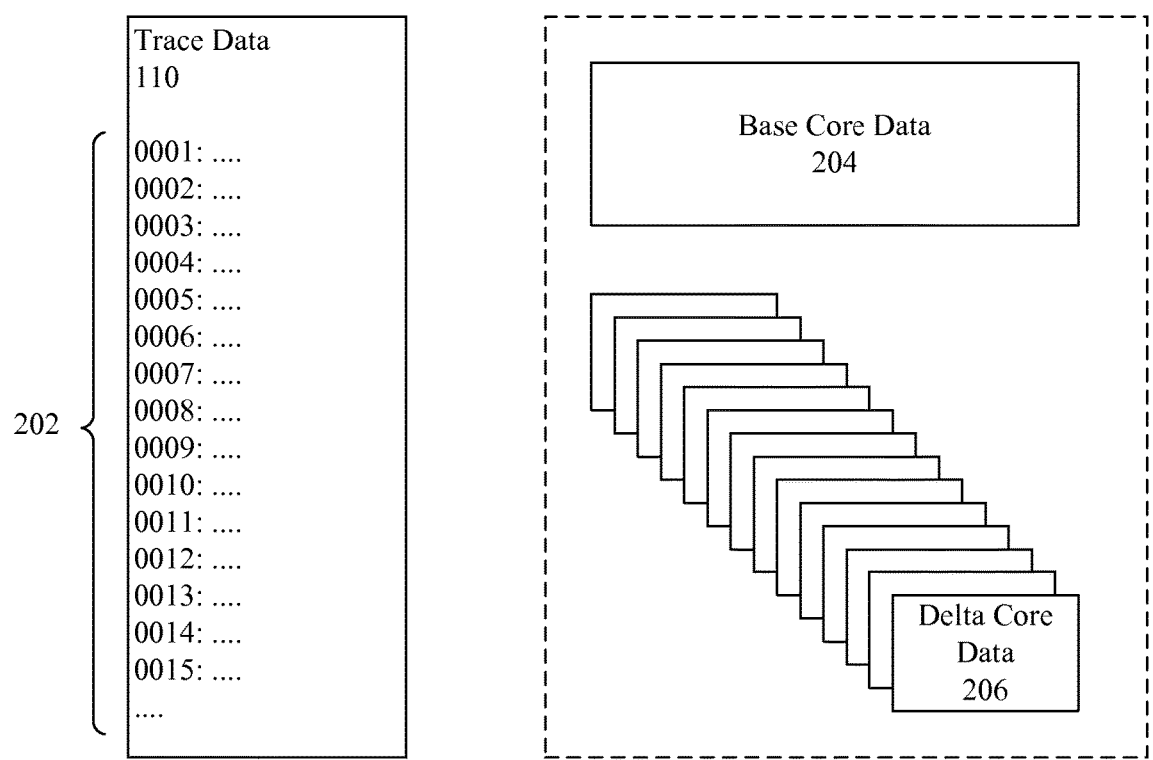
FIG. 2 depicts trace data, base core data and delta core data in accordance with one embodiment disclosed within this specification.

FIG. 2 depicts trace data 110, base core data 204 and delta core data 206 in accordance with one embodiment disclosed within this specification. The trace data 110 can be stored in a file and can comprise a sequential set of trace entries 202 (e.g., trace records) produced in response to a corresponding trace point. The trace entries 202 can be numbered sequentially in order of their creation. The core data processing application 112 can be arranged to monitor execution of the application 106 for the outputting of trace entries 202 to the trace file. In response to the entry of the first trace entry 202 in the trace file resulting from the processing of the first trace point by the application 106, the core data processing application 112 can be configured to save a substantially contemporaneous image of the memory 108 as a first set of core data in the form of base core data 204. In this regard, the base core data 204 can correspond to the state of the core data 118 when the image of the memory 108 is saved. As used herein, the term "core data" means an image of data stored at a set of memory locations at a particular point during execution of an application. As used herein, the term "set of memory locations" means one or more memory locations.

In response to each subsequent entry of trace data 202 in the trace file resulting from the processing of each further trace point by the application 106, the core data processing application 112 can be configured to save a respective second set of core data in the form of delta core data 206. As used herein, the term "delta core data" means data that represents at least a portion of a difference between a first set of core data and a second set of core data. In other words, a particular delta core data can be a recordation of a change between the first set of core data and the second set of core data, for example between previous memory content and current memory content.

A first set of delta core data 206 can be produced in response to the processing of the second trace point in the application 106. This first set of delta core data 206 can comprise a record of each address and corresponding data contents in memory 108 that have been modified since the base core data 204 was recorded. In other words, the delta core data 206 can represent the difference between the contents of the memory 108 at the first trace point and its contents at the second trace point. The third and each subsequent set of delta core data 206 each can comprise a record of each address and corresponding data contents in memory 108 that have been modified since the immediately prior delta core data 206 was recorded.

In the present example, the delta core data 206 can be recorded incrementally, that is, each time a change is made in the memory, the change can be logged as pending delta core data (not shown) until new trace data 106 is produced at which point the pending delta core data can be saved in association with the new trace entry 202 as a new set of delta core data 206. The recording of a new set of pending delta core data can proceed until the next trace point is processed by the application 106.

Figure 3:
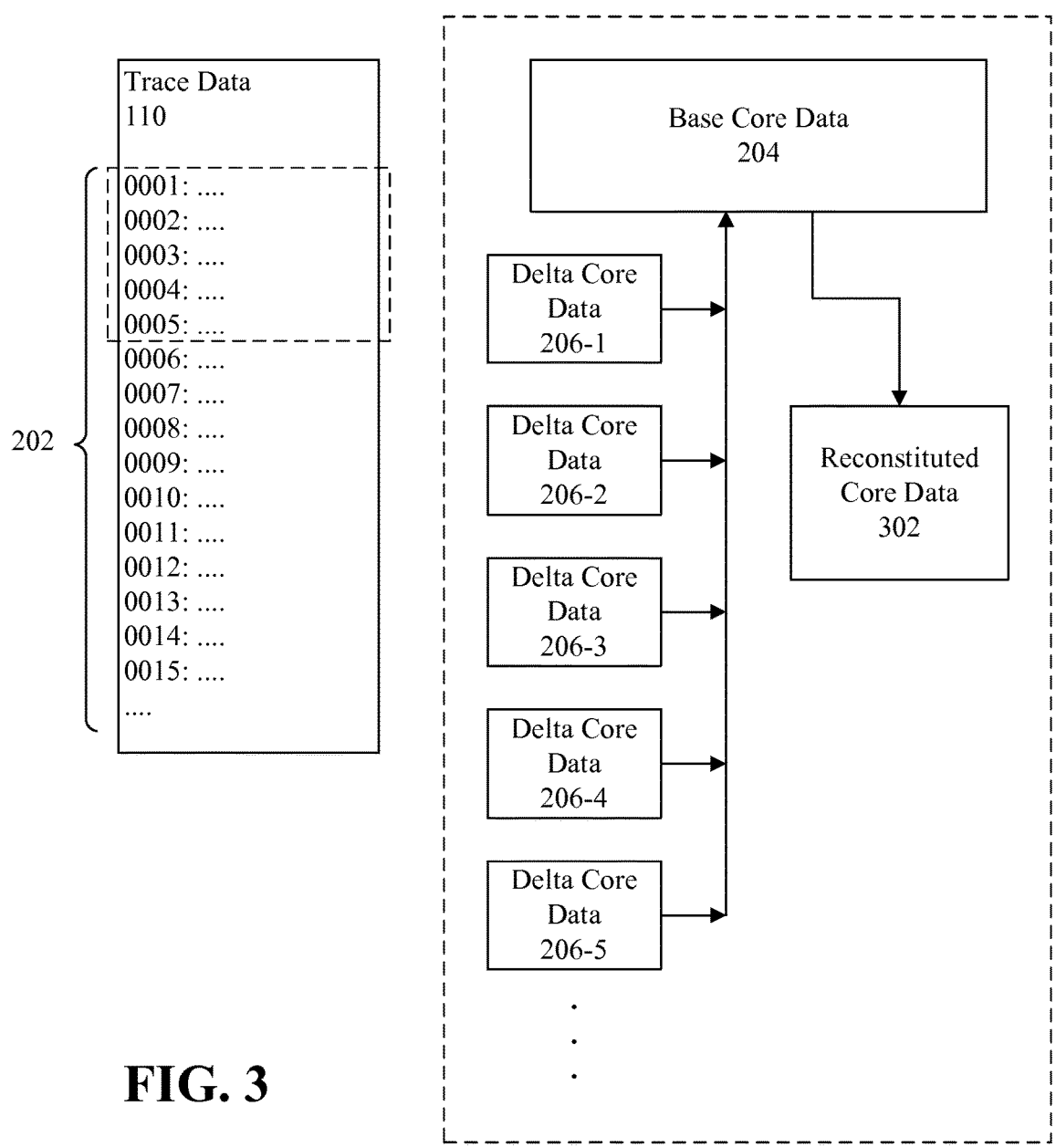
FIG. 3 depicts trace data, base core data, delta core data and reconstituted core data in accordance with one embodiment disclosed within this specification.

FIG. 3 depicts trace data 110, base core data 204, delta core data 206 and reconstituted core data 302 in accordance with one embodiment disclosed within this specification. The core data reconstitution application 114 can be configured to, in response to user selection of a given record of trace data 202, identify all preceding trace entries 202 in the trace file and each associated set of delta core data 206-1, 206-2, 206-3, 206-4, 206-5. Each such set of delta core data 206-1-206-5, in order of creation, that is, oldest first, can be applied to the base core data 204. Once all of the identified sets of delta core data 206-1-206-5 have been applied to the base core data 204, a reconstituted set of core data 118 can be generated that comprises the state of the memory 108 at substantially the same time in the historical processing of the application 106 that the user selected trace entry 202. In the same manner, the core data reconstitution application 114 can be configured to provide the relevant reconstituted core data 302 for each of a range of two or more selected trace entries 206-1-206-5.

Figure 4:
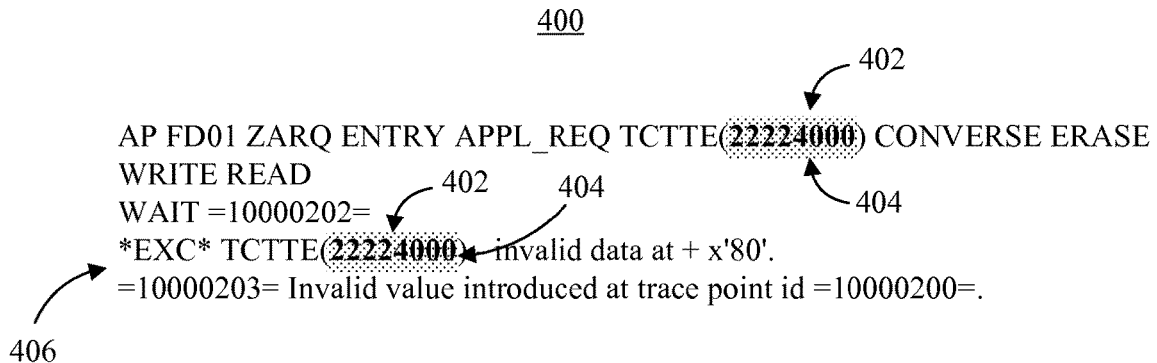
FIG. 4 depicts an example of a trace entry comprising a suspicious value in accordance with one embodiment disclosed within this specification.

FIG. 4 depicts an example of a trace entry 400 comprising a suspicious value in accordance with one embodiment disclosed within this specification. The suspicious value identification application 116 can generate the exception trace entry 400 to indicate an identifier for the trace point (e.g., trace entry) at which the content of the address was first corrupted. Moreover, the suspicious value identification application 116 can identify suspicious values in the trace entry 400 and indicate that such values are suspicious. In illustration, the suspicious value identification application 116 can identify the pointer 402 as a suspicious entry. Accordingly, the suspicious value identification application 116 can apply highlighting 404 to the value 402 in the sample trace entry 400. The highlighting 404 can be applied in any suitable manner, as will be described herein. In one arrangement, the trace entry 400 can include an entry 406, such as an *EXC* entry, which confirms the pointer 402 is a suspicious value. Thus, the trace entry 400 may contain more than one instance of the pointer 402, and highlighting 404 can be applied to both instances, though the present arrangements are not limited in this regard. Regardless of whether one instance, or more than one instance, of the pointer 402 is highlighted, when the trace data 110 is reviewed, such trace point can be easily identified.

To identify suspicious values in the trace data 110, the suspicious value identification application 116 can implement validation logic that compares what value a data field within a trace entry actually contains against what value(s) or set/range of values the data field may be expected to contain based on a declared data type of the data field. Data field declarations utilize data type identifiers that define the bit width and the type of data the data field is declared to store, and as such, define correct data values or ranges of data values that may be stored within the data fields. Data values that are written to the trace entry are interpreted, field by field, and compared to each data field's data type declaration, either within the source code, or within encoded metadata of intermediate or executable code. Data field declarations may be further enhanced to include indicators of which color/colors to utilize to highlight out-of-range or out-of-data-type trace values within the trace entry. The data field declarations may also/alternatively be enhanced to include additional indicators of which color/colors to utilize to highlight different error types (e.g., out-of-range values versus values of a completely different data type relative to the declaration). As such, any out out-of-range or out-of-data-type trace values, and particular error types, may be highlighted within a trace entry to expedite issue resolution for the particular error or problem. Accordingly, the present subject matter correlates trace values with data field declarations to improve trace entry analysis by program/system developers.

For example, for each declared data field, a declared data field type may be utilized during trace analysis to determine an appropriate/acceptable value or range of values and/or data type to expect within the associated data field of the trace. The determined acceptable value or range of values and/or data type may be encoded as metadata within the respective data fields, such as within intermediate code or executable code (e.g., within dummy control sections (e.g., DSECTs)). During trace analysis, the source code data type declarations or the encoded metadata may be utilized to compare trace values of data fields to identify any data fields that contain erroneous values. Any erroneous values may be highlighted within the trace output data to indicate to a user that the highlighted data values are out-of-range or contain improper data values, and to indicate that these data fields may warrant further investigation with respect to being a potential root cause of the particular error or problem.

Certain of the examples herein utilize the IBM® Customer Information Control System (CICS®) environment (IBM and CICS are trademarks of International Business Machines Corporation in the United States, other countries, or both). However, it is understood that differences exist between different platforms and that the present subject matter may be implemented in any platform and in any manner appropriate for a given implementation.

Within the CICS® environment, for each trace entry, where applicable DATA fields exist, the DATA fields are traced out where appropriate. In such an implementation, the present technology would interpret the DATA fields that are written to the trace entry, field by field, and compare the actual field values against each field's data type within a data structure that exists within the source code. Suspicious fields may then be highlighted for review.

For example, consider a field that is a counter for the number of times a file is opened. The counter field would be expected to be zero or positive because there would not be a negative number of times—a MINUS value—for a file open operation. In such a situation, the present technology may identify that the counter arithmetic has erred where values that are expected to be positive are negative.

The data field declaration of the counter field may have an additional parameter added that indicates to highlight the trace data, for example in the color red, if the value is equal to a negative number (e.g., EQNEGRED). As such, the counter field data value within the trace data will be highlighted in red under a circumstance where the data value is negative. Otherwise, the counter field data value may be displayed, for example, in the color green to indicate that there is no problem with the data value relative to the data field declaration. Such a counter may be declared, for example, as "BIN32 counter EQNEGRED." Similarly, for fields that are expected to always be zero or negative, a data field declaration of the respective data field may have an additional parameter added that indicates to highlight the trace data, for example in the color red, if the value is equal to a positive number (e.g., EQPOSRED).

The following paragraph provides a non-exhaustive list of several additional examples of data fields and value/range declarations that may be established, validated, and highlighted within a trace if their values are outside of the range of what they could be reasonably expected to contain. It is understood that many additional forms of data fields and value/range declarations are possible and all are considered within the scope of the present subject matter.

For example, data fields defined as BIN16 and BIN32 may be expected to contain positive numeric data and these data fields may be highlighted if they contain character (CHAR) data (e.g., CHARORANGE) or if they are determined to have negative data values (e.g., EQCHARRED). Additionally, data fields defined as BIN(31) may be highlighted where half-word loading code (e.g., LOAD HALFWORD) propagates a sign bit (unintentionally) to the top half of the data field causing the data field to have a negative value. Similarly, return addresses may be verified, for example, using a declaration that specifies that a trace point may be issued "here" if the module has been called from a particular module (e.g., module "Y") and the return address field does not point to a location within that particular module (e.g., within the module "Y"). Traced parameter lists (e.g., PLISTS) often contain pointers to other areas, and these pointers may be verified to confirm that they only contain valid pointer values rather than some other form of data of an incorrect data type. Timestamps with inordinately large elapsed times between entry and exit of a module for adjacent or near adjacent trace entries may be highlighted. A PLIST where the last pointer (e.g., that indicates a last argument) does not have its x'80' bit set or a PLIST that ends prematurely (e.g., no x'80' bit set in the leftmost byte of the last pointer) may be highlighted. Additionally, unbalanced GETMAIN/FREEMAIN events, and out-of-bound (or non-zero) execution (EXEC) interface block (EIB) response fields (EIBRESP) values may be highlighted. Non-zero return codes from other products (often passed in a particular register, such as register 15) or register "branch to" values (such as R14 branch to values) may be highlighted if an unusual value exists. Further, unbalanced module ENTRY/EXIT events, non-zero message inserts, data fields containing values of architected response and reason codes as they are propagated to their callers, character (CHAR) data that is not a valid value for the codepage in use, and initial image values of "getmained" storage values when not x'00' may be highlighted. Reverse highlighting may also be used to further enhance user identification of types of trace data, such as for example, to encapsulate and identify dummy control sections (e.g., DSECTs) when they are traced. Reverse highlighting may be used for other distinctions as appropriate for a given implementation.

The product being traced may additionally be architected so that field declarations are grouped in an intuitive manner, such as per the examples above, so that the field declarations may be more easily identified. Further, more critical errors in data field values may be highlighted more boldly than less critical errors. For example, EIBRESP values may be highlighted in red, return codes (RC's) from other products may be highlighted in blue, and pointers containing character data may be highlighted in yellow. Many other variations are possible and all are considered within the scope of the present subject matter.

These groupings may be further enhanced by reverse highlighting thus providing a richer set of visual aids to assist in identifying suspicious data field values for further investigation. Because the present technology utilizes data field declarations, the trace data processing module "knows" the data field names (e.g., because it has to interpret them). As such, a suspicious field, once selected by way of, for example, a question mark against the highlighted field, may then display the data field name to further assist the user/troubleshooter.

In some instances, the determination of whether a pointer addresses a suspicious field value may not be readily apparent based exclusively on the pointer value as recorded in trace entry 400 of FIG. 4. For example, trace entries into the trace data 110 may continue over a period of time. Data for a particular memory address captured in a previous trace entry may be overwritten, reallocated, freed, etc. by the time trace entry 400 is generated. If the trace entry 400 includes a pointer that points to the same memory address, and the data presently stored at that memory address appears to be valid, but was not earlier, the pointer may not be indicated as being a suspicious value if only the present content(s) of the memory address is evaluated.

Nonetheless, if the trace entry 400 comprises a pointer, when the trace entry 400 is generated, or at a later time, the suspicious value identification application 116 can process the delta core data 206 generated for both the current and previous trace entries to arrive at a determination as to whether the pointer points to an address that stores, or previously has stored, one or more erroneous values. Specifically, the suspicious value identification application 116 can search back through the delta core data 206 to identify records indicating where the contents of the address were updated. Based on these delta core records, the suspicious value identification application 116 can identify corresponding trace entries, and determine whether any such trace entries indicate that the address contained erroneous values at the time such trace entries were generated, or currently contains erroneous values, for example as previously described. If any such trace entries contain erroneous values, then the pointer in the trace entry 400 can be identified as being suspicious and indicated as such. For example, the pointer can be highlighted as previously described.

In illustration, to determine whether the value that is, or has been, stored at the address is an erroneous value, the suspicious value identification application 116 can interpret at least one data field in a trace entry identified by the delta core data using a data field declaration of the data field that identifies a data type of the data field. Further, the suspicious value identification application 116 can compare, for the interpreted data field, an actual data value of the interpreted data field with the data field declaration. Further, the suspicious value identification application 116 can determine, based upon the comparison, whether the actual data value of the interpreted data field contains, or previously contained, an erroneous data value based upon the data field declaration.

To interpret the data field in the trace entry identified by the delta core data using the data field declaration, the suspicious value identification application 116 can identify the data field within the trace entry. The suspicious value identification application 116 further can identify, for the identified data field, the data field declaration within source code or executable code of the application, and determine the data type of the field data from the identified data field declaration within the source code or the executable code. To compare, for the interpreted data field, an actual data value of the interpreted data field with the data field declaration, the suspicious value identification application 116 can determine a correct set of possible data values for the interpreted data field based upon the data field declaration, and compare the actual data value of the interpreted data field with the determined correct set of possible data values for the interpreted data field.

In one arrangement, the field declaration can comprise a highlight parameter that specifies a manner in which to highlight data values within the trace entry that violate the data field declaration. To indicate that the pointer is a suspicious value, the suspicious value identification application 116 can highlight the pointer in the manner specified by the highlight parameter, for example in response to determining that the at least one actual data value violates the data field declaration and contains the erroneous value.

In view of the foregoing, the present arrangements allow fields of interest to be declared with a new parameter that influences how the field may be displayed in a trace if it contains an out-of-range value or data value type. Accordingly, expedited problem resolution may be achieved, and users and service programmers may be assisted with determination of user or coding errors, respectively. These positive results may in turn help reduce service costs, and improve customer satisfaction and problem resolution response times.

The correlation of the data field may be performed during trace entry post processing or as part of mainstream trace processing itself. As such, trace entry post processing may be performed in response to a user request for trace data, or trace data may be modified and stored pre-processed. Alternatively, mainstream trace processing may be performed during actual trace data capture.

As such, the trace value correlation with data field declarations described herein may be performed in real time to allow prompt correlation of data field declarations with trace values. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 5:
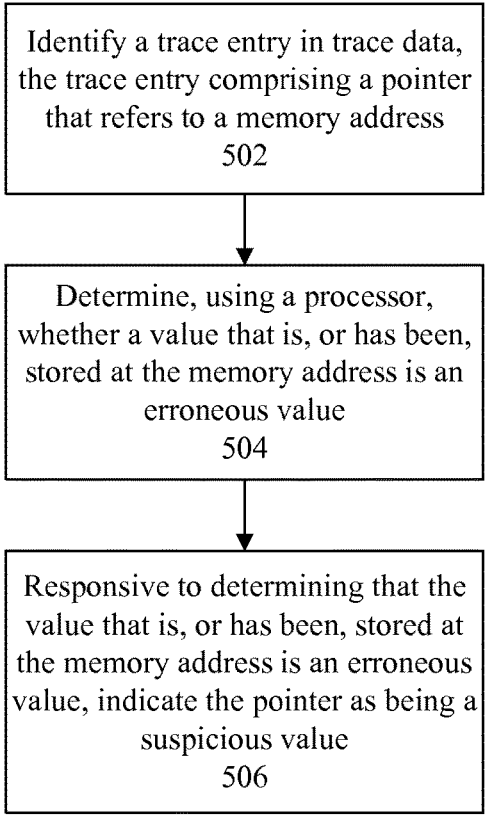
FIG. 5 is a flow chart illustrating a method of performing diagnostic tracing of an executing application in accordance with another embodiment disclosed within this specification.

FIG. 5 is a flow chart illustrating a method 500 of performing diagnostic tracing of an executing application in accordance with another embodiment disclosed within this specification. At step 502, a trace entry in trace data can be identified. The trace entry can comprise a pointer that refers to a memory address.

At step 504, whether a value that is, or has been, stored at the memory address is an erroneous value can be determined. For example, delta core data generated for at least one trace entry can be processed to determine whether the value that is, or has been, stored at the memory address is an erroneous value. The delta core data can be data that represents at least a portion of a difference between a first set of core data and a second set of core data. The delta core data can be generated during execution of the application, for example as described herein. The delta core data can comprise a record of the memory address and corresponding data content in the memory address that has been modified since the first set of core data was recorded.

Further, to determine whether the value that is, or has been, stored at the memory address is an erroneous value, at least one data field in a trace entry identified by the delta core data can be interpreted using a data field declaration of the data field that identifies a data type of the data field. Interpreting at least one data field in the trace entry identified by the delta core data can include identifying the data field within the trace entry, identifying, for the identified data field within the trace entry, the data field declaration within source code or executable code, and determining the data type of the data field from the identified data field declaration within the source code or the executable code. For the interpreted data field, an actual data value of the interpreted data field can be compared with the data field declaration. Based upon the comparison, whether the actual data value of the interpreted data field contains an erroneous data value can be determined based upon the data field declaration.

Comparing the actual data value of the interpreted data field with the data field declaration can include determining a correct set of possible data values for the interpreted data field based upon the data field declaration and comparing the actual data value of the interpreted data field with the determined correct set of possible data values for the interpreted data field.

At step 506, responsive to determining that the value that is, or has been, stored at the memory address is an erroneous value, the pointer can be indicated as being a suspicious value. In one arrangement, the data field declaration can comprise a highlight parameter that specifies a manner in which to highlight data values within the trace entry that violate the data field declaration. The pointer can be indicated as being a suspicious value by highlighting, in response to determining that the at least one actual data value violates the data field declaration and contains the erroneous value, the pointer in the manner specified by the highlight parameter.

Figure 6:
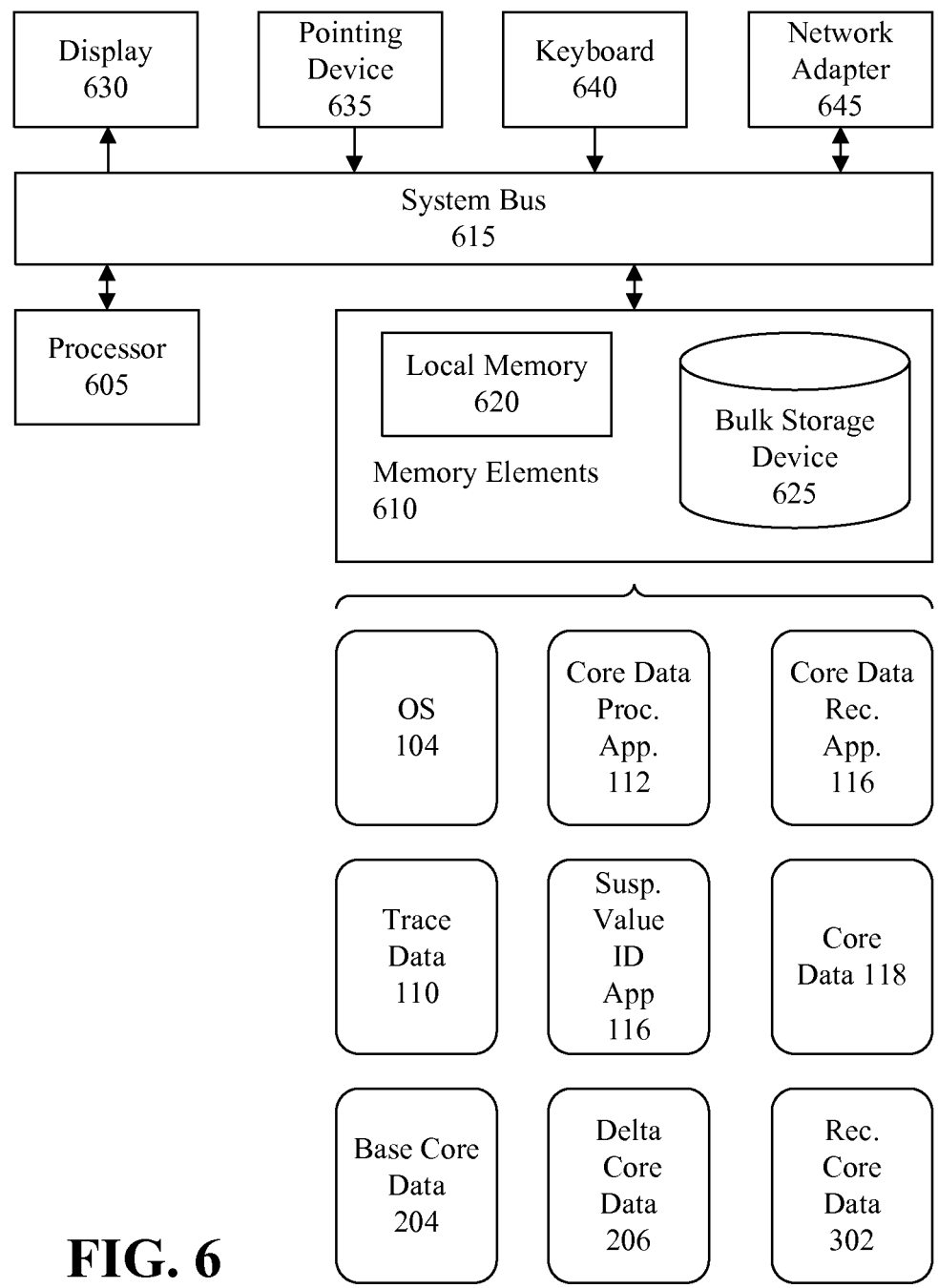
FIG. 6 is a block diagram illustrating further details of the system of FIG. 1 in accordance with one embodiment disclosed within this specification.

FIG. 6 is a block diagram illustrating further details of the processing system 102 of FIG. 1 in accordance with one embodiment disclosed within this specification. The processing system 102 can include at least one processor 605 (e.g., a central processing unit) coupled to memory elements 610 through a system bus 615 or other suitable circuitry. As such, the processing system 102 can store program code within the memory elements 610. The processor 605 can execute the program code accessed from the memory elements 610 via the system bus 615. It should be appreciated that the processing system 102 can be implemented in the form of any system including a processor and memory that is capable of performing the functions and/or operations described within this specification. For example, the processing system 102 can be implemented as a computer, a workstation, a mobile computer, a laptop computer, tablet computer, a smart phone, a personal digital assistant, an appliance, and so on.

The memory elements 610 can include one or more physical memory devices such as, for example, local memory 620 and one or more bulk storage devices 625. Local memory 620 refers to RAM or other non-persistent memory device(s) generally used during actual execution of the program code. The bulk storage device(s) 625 can be implemented as a hard disk drive (HDD), solid state drive (SSD), or other persistent data storage device. The processing system 102 also can include one or more cache memories (not shown) that provide temporary storage of at least some program code in order to reduce the number of times program code must be retrieved from the bulk storage device 625 during execution.

Input/output (I/O) devices such as a display 630, a pointing device 635 and a keyboard 640 can be coupled to the processing system 102. The I/O devices can be coupled to the processing system 102 either directly or through intervening I/O controllers. For example, the display 630 can be coupled to the processing system 102 via a graphics processing unit (GPU), which may be a component of the processor 605 or a discrete device. One or more network adapters 645 also can be coupled to processing system 102 to enable processing system 102 to become coupled to other systems, computer systems, remote printers, and/or remote storage devices through intervening private or public networks. Modems, cable modems, and Ethernet cards are examples of different types of network adapters 645 that can be used with processing system 102.

The memory elements 610 can store the operating system 104, the core data processing application 112, the core data reconstitution application 114 and the suspicious value identification application 116 depicted in FIG. 1. Further, the memory elements 610 can store the trace data 110 and the core data 118 of FIG. 1, the base core data 204 and delta core data 206 of FIG. 2, and the reconstituted core data 302 of FIG. 3.

Being implemented in the form of executable program code, the core data processing application 112, the core data reconstitution application 114 and the suspicious value identification application 116 can be executed by the processing system 102 and, as such, can be considered part of the processing system 102. In this regard, the core data processing application 112, the core data reconstitution application 114 and the suspicious value identification application 116 are functional data structures that impart functionality when employed as part of the processing system 102. The trace data 110, core data 118, base core data 204, delta core data 206, and reconstituted core data 302 also are functional data structures that impart functionality when processed by the processing system 102.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of performing diagnostic tracing of an executing application, comprising:
   identifying a trace entry in trace data, the trace entry including a pointer that refers to a memory address;
   generating delta core data for at least one trace entry;
   determining whether a value itself that is, or has been, stored at the memory address is an erroneous value; and
   indicating, responsive to the determination, the pointer as being a suspicious value by specifically identifying the pointer, wherein
   the determining includes processing the delta core data, and
   the delta core data represents at least a portion of a difference between a first set of core data and a second set of core data.

2. The method of claim 1, wherein
   the delta core data is generated during execution of the application.

3. The method of claim 1, wherein
   the delta core data includes
   a record of the memory address and
   corresponding data content in the memory address that has been modified since the first set of core data was recorded.

4. The method of claim 1, wherein
   the determination is based upon a declared data type of a data field stored within the memory address.

5. The method of claim 1, wherein
   the determination is based upon a range of values expected for the value stored at the memory address.

6. A computer hardware system configured to perform diagnostic tracing of an executing application, comprising:
   a hardware processor programmed to initiate the following executable operations:
   identifying a trace entry in trace data, the trace entry including a pointer that refers to a memory address;
   generating delta core data for at least one trace entry;
   determining whether a value itself that is, or has been, stored at the memory address is an erroneous value; and
   indicating, responsive to the determination, the pointer as being a suspicious value by specifically identifying the pointer, wherein
   the determining includes processing delta core data, and
   the delta core data represents at least a portion of a difference between a first set of core data and a second set of core data.

7. The system of claim 6, wherein
   the delta core data is generated during execution of the application.

8. The system of claim 6, wherein
   the delta core data includes
   a record of the memory address and
   corresponding data content in the memory address that has been modified since the first set of core data was recorded.

9. The system of claim 6, wherein
   the determination is based upon a declared data type of a data field stored within the memory address.

10. The system of claim 6, wherein
    the determination is based upon a range of values expected for the value stored at the memory address.

11. A computer program product for performing diagnostic tracing of an executing application, comprising:
    a computer readable storage medium having program code stored thereon, wherein the computer readable storage medium is not a signal per se;
    the program code, which when executed by a computer hardware system, causes the computer hardware system to perform:
    identifying a trace entry in trace data, the trace entry including a pointer that refers to a memory address;
    generating delta core data for at least one trace entry;
    determining whether a value itself that is, or has been, stored at the memory address is an erroneous value; and
    indicating, responsive to the determination, the pointer as being a suspicious value by specifically identifying the pointer, wherein the determining includes processing the delta core data, and the delta core data represents at least a portion of a difference between a first set of core data and a second set of core data.

12. The computer program product of claim 11, wherein the delta core data is generated during execution of the application.

13. The computer program product of claim 11, wherein the delta core data includes a record of the memory address and corresponding data content in the memory address that has been modified since the first set of core data was recorded.

14. The computer program product of claim 11, wherein the determination is based upon a declared data type of a data field stored within the memory address.

15. The computer program product of claim 11, wherein the determination is based upon a range of values expected for the value stored at the memory address.

* * * * *